United States Patent
Hanson et al.

(10) Patent No.: US 10,053,640 B2
(45) Date of Patent: Aug. 21, 2018

(54) METHOD AND KIT FOR TREATMENT OF COMPONENTS UTILIZED IN A CRUDE OIL SERVICE OPERATION

(71) Applicant: Aculon, Inc., San Diego, CA (US)

(72) Inventors: Eric Hanson, Encinitas, CA (US); Edward Hughes, San Diego, CA (US); Sean Eric Drees, Boerne, TX (US); Andrew Timothy Marzec, San Antonio, TX (US); Brian Keith Brashear, San Antonio, TX (US)

(73) Assignees: ACULON INC., San Diego, CA (US); ELECTROLAB, INC, Boerne, TX (US)

( * ) Notice: Subject to any disclaimer, the term of this patent is extended or adjusted under 35 U.S.C. 154(b) by 0 days.

(21) Appl. No.: 15/211,224

(22) Filed: Jul. 15, 2016

(65) Prior Publication Data

US 2017/0130145 A1    May 11, 2017

Related U.S. Application Data

(62) Division of application No. 14/099,497, filed on Dec. 6, 2013, now Pat. No. 9,476,754.

(60) Provisional application No. 61/770,963, filed on Feb. 28, 2013.

(51) Int. Cl.
*C10G 75/00* (2006.01)
*C09D 5/00* (2006.01)

(52) U.S. Cl.
CPC .............. *C10G 75/00* (2013.01); *C09D 5/00* (2013.01)

(58) Field of Classification Search
CPC .................................. C10G 75/00; C09D 5/00
See application file for complete search history.

(56) References Cited

U.S. PATENT DOCUMENTS

| | | |
|---|---|---|
| 6,146,767 A | 11/2000 | Schwartz |
| 7,625,149 B2 | 12/2009 | Hanson et al. |
| 7,691,478 B2 | 4/2010 | Avaltroni et al. |
| 7,740,940 B2 | 6/2010 | Hanson |
| 7,879,437 B2 | 2/2011 | Hanson |
| 7,879,456 B2 | 2/2011 | Schwartz et al. |
| 7,901,777 B2 | 3/2011 | Hanson |
| 7,989,069 B2 | 8/2011 | Bruner et al. |
| 8,025,974 B2 | 9/2011 | Hanson |
| 8,048,487 B2 | 11/2011 | Hanson |

(Continued)

*Primary Examiner* — Ryan J Walters
(74) *Attorney, Agent, or Firm* — Blynn L. Shideler; Krisanne Shideler; BLK Law Group

(57) ABSTRACT

A method and kit for treatment of a stainless steel or other nickel alloy component utilized in a crude oil service operation including cleaning a surface of the component to remove surface contamination; drying the cleaned surface of the component; applying a coat of Self-Assembled Monolayer of Phosphonate (SAMP) to the cleaned and dried surface of the component to form a treated component; and installing the treated component into a section of a crude oil service operation. The coating reduces paraffin/asphaltene deposition on the component. The kit includes a cleaner wipe impregnated with a cleaning substance for cleaning the component; a nano-coating wipe impregnated with a SAMP for applying a nano-coating of the SAMP to the component; and instructions for treating said component utilizing the cleaner wipe and the nano-coating wipe.

3 Claims, 6 Drawing Sheets

(56) References Cited

U.S. PATENT DOCUMENTS

| | | |
|---|---|---|
| 8,053,081 B2 | 11/2011 | Petcavich |
| 8,067,103 B2 | 11/2011 | Hanson |
| 8,178,004 B2 | 5/2012 | Hanson |
| 8,236,426 B2 | 8/2012 | Hanson et al. |
| 8,337,985 B2 | 12/2012 | Hanson |
| 8,432,036 B2 | 4/2013 | Hanson et al. |
| 8,445,423 B2 | 5/2013 | Bruner et al. |
| 8,524,367 B2 | 9/2013 | Hanson |
| 8,558,117 B2 | 10/2013 | Hanson |
| 8,658,258 B2 | 2/2014 | Hanson |
| 9,476,754 B2 | 10/2016 | Drees et al. |
| 2004/0009300 A1* | 1/2004 | Shimakura ............... B05D 7/16 427/407.1 |
| 2008/0131709 A1 | 6/2008 | Hanson et al. |
| 2009/0246394 A1 | 10/2009 | Hanson et al. |
| 2011/0252884 A1 | 10/2011 | Hanscombe |
| 2012/0003481 A1 | 1/2012 | Hanson et al. |
| 2013/0037161 A1 | 2/2013 | Hanson |
| 2014/0272149 A1 | 9/2014 | Hanson |
| 2014/0272150 A1 | 9/2014 | Hanson |
| 2014/0272428 A1 | 9/2014 | Hanson |
| 2015/0083397 A1 | 3/2015 | Monroe et al. |
| 2015/0252656 A1 | 9/2015 | Hanson |

\* cited by examiner

METHOD AND KIT FOR TREATMENT OF COMPONENTS UTILIZED IN A CRUDE OIL SERVICE OPERATION

RELATED APPLICATIONS

This application is a divisional of U.S. patent application Ser. No. 14/099,497 filed Dec. 6, 2013 and which published as U.S. Patent Publication 2014-0237800 on Aug. 28, 2014, which application is incorporated herein by reference. U.S. patent application Ser. No. 14/099,497 claims the benefit of Provisional Application Ser. No. 61/770,963 filed Feb. 28, 2013, which application is incorporated herein by reference.

BACKGROUND OF THE INVENTION

Field of the Invention

The present invention relates to paraffin and asphaltene deposition on components used in crude oil service operations. More particularly, the present invention relates to a method and kit for surface treatment of cooperating, controller or sensor components used in crude oil service operations to reduce paraffin/asphaltene deposition.

Background Information

Paraffins, more commonly referred to as alkanes, are the chemical family of saturated hydrocarbons that result from combining $CH_2$ groups in succession. Additional $CH_2$ groups are added to form a straight-chain paraffin.

The term "wax" simply refers to saturated hydrocarbons that contain more than 16 carbon atoms in the paraffin series ($C_{16}$-$C_{40}$) and are in a solid state at room temperature. The majority of waxes present in crude oil are considered synthetic paraffin waxes with non-oxidized saturated alkanes.

Paraffin may exist in crude oil in all three states. At standard room temperature, $C_{16+}$n-paraffins generally exists in a solid form and solidify to form deposits. Wax is the product of paraffin deposition, so in the industrial context, "wax" and "paraffin" are often used interchangeably.

Therefore, "paraffin wax deposition" refers to the solid form of paraffin that solidify to cause deposition.

Because asphaltene is typically talked about in the same context as paraffin, it is important to understand what asphaltene is and why it is problematic to the crude oil service operations. Asphaltene is the material present in petroleum that is insoluble in n-paraffins but soluble in aromatic solvents. Asphaltenes cause catalyst deactivation and sediment formation.

Tars or asphaltenes occur in many crudes as colloidal suspended solid particles. Precipitation takes place when the crude loses its ability to keep those particles dispersed. Many of the same factors affecting paraffin deposition (discussed below) also affect asphaltene deposition.

Paraffins precipitate out of waxy crudes when there is a slight change in equilibrium conditions, causing a loss of solubility of the wax in the crude. A lowering in temperature is the most common cause of paraffin precipitation.

Thus, hydrocarbon liquids, including both crude oils and condensates, form a paraffin or asphaltene solid phase when process temperatures fall below the cloud point (or Wax Appearance Temperature) of the liquid. While this normally occurs in colder temperature services, it may also occur in any process where the combination of complex composition factors, such as API gravity, pressure/temperature variables and other factors favor deposition.

The presence of asphaltenes increases the difficulties for paraffin wax treatments because these structures are almost always found in association with waxes when they are retrieved from wells, storage tanks, or pipelines (see Becker J. R. 1997, Crude oil waxes, emulsions, and asphaltenes. Tulsa, Okla.; PennWell Publishing Company). While paraffin wax deposition may be reduced by increasing the flow velocity of crude, increasing fluid velocities increases the likelihood of asphaltene deposition.

Further, studies show that the amount of asphaltene precipitation decreases as the number of carbons forming straight-chain paraffin increases. In other words, treatment of paraffin wax could escalate the precipitation of heavier, problematic asphaltene compounds. Therefore, treatment of paraffin and asphaltene deposition must both be considered in the balance.

Once formed, these paraffin/asphaltene solids will typically deposit on tank-mounted level sensors and instrumentation. This deposition presents a potential safety hazard when critical operational and/or safety sensors are affected. This may cause a loss of billions of dollars per year worldwide through the enormous cost of remediation, reduced or deferred production, well shut-ins, equipment replacements and/or abandonments, equipment failures, extra horsepower requirements, and increased manpower needs.

The modern petroleum industry has developed new technologies for controlling the deposition of petroleum paraffin and asphaltenes, particularly in wells, storage tanks, and pipelines. However, these technologies have been less effective on sensitive tank level sensors, flow sensors, and other instrumentation. Traditional methods of management and remediation have been established for many years and include the following: a. Chemical Treatments and Additives: While chemical treatments help to manage solids deposition in connected lines, instrument tubing and storage tank internal components, some chemicals do not suspend the paraffin indefinitely and may be damaging to the environment; b. Hot Oiling: Hot oiling is one method often employed for removing deposition in storage tanks Paraffin and asphaltene buildup is handled by periodically pumping very hot oil, augmented by cleansing additives, into the vessels in order to melt the accumulations from tank walls, sensors and internal equipment; and c. Manual Cleaning: During normal maintenance operations, internally mounted equipment may be periodically subject to manual cleaning. This typically involves removal of sensors, instruments, etc. from out-of-service tanks and process equipment for cleaning Alternately, personnel may physically enter out-of-service tanks to perform the cleaning with sensors and equipment in place. These methods typically involve considerable expense in time and labor for taking equipment out of service, the cleaning process itself, and management of safety associated with hazardous conditions, including hydrogen sulfide (H2S) exposure.

However, these procedures are labor and cost intensive and are not very effective with sensitive sensors and instrumentations. The solution is to avoid wax and asphaltene depositions in the first place.

PRIOR PATENT LITERATURE

The patent literature has teachings relevant to the present invention. U.S. Pat. No. 7,396,594, developed by researchers at Princeton, discloses a process for providing on the surface of a substrate an adherent phosphorous acid-based coating layer, the method comprising contacting said surface with a carrier conveying a coating composition comprising an acid selected from the group consisting of phosphoric acids, organo-phosphoric acids, phosphonic acids, and mixtures thereof, at a sufficient temperature and for a sufficient time to bond at least a portion of the acid in the composition to the oxide surface. Specifically, this patent teaches using phosphorous based coating layers (SAMPS) to bond to surfaces to alter the properties of the surface. See Columns 4-6.

U.S. Pat. No. 7,691,478, developed by some of the co-inventors of the present invention, discloses structures comprising substrates comprised of an organic material capable of accepting a proton from an organophosphorous compound and a film of the organophosphorous compound bonded to the substrate wherein the structures are useful in a variety of applications such as visual display devices. Specifically this patent teaches deposition of thin films of phosphonic acids, SAMPs, containing hydrophobic and oleophobic tails. See FIG. 2 and examples in column 3.

U.S. Pat. No. 7,879,456, developed by researchers from Princeton, discloses methods for bonding adherent phosphorous-containing coating layers to oxide surfaces on substrates wherein the substrates with oxide surfaces are selected from: (a) oxidized iron, titanium, silicon, tin and vanadium; (b) indium tin oxide; and (c) substrates with oxide layers deposited thereon, wherein the substrates on which oxide layers are deposited are selected from ceramics, semiconductors, metals, plastics and glass, and the method contacts the oxide surface with a carrier conveying an organo-phosphonic acid coating composition and heats the oxide surface and carrier at a sufficient temperature while maintaining contact for a sufficient time to bond a layer of the organophosphonic acid to the oxide surface. Specifically this patent teaches using carriers such as pads to deliver SAMPs to sensor components. See column 10.

U.S. Pat. No. 8,025,794, developed by some of the co-inventors of the present invention, discloses inorganic substrates with a hydrophobic surface layer of a fluorinated material wherein the fluorinated material can be directly adhered to the inorganic substrate or can be indirectly adhered to the inorganic substrate through an intermediate organometallic coating. More specifically this patent teaches using SAMPS to impart oil repellent properties to surfaces including sticky oil substances like squalene. Further this patent teaches cleaning and drying a substrate such as stainless steel before applying a SAMP to the surface. See columns 7-9. Additionally note child application that issued as U.S. Pat. No. 8,236,426 which teaches using SAMPs to impart easy clean properties to stainless steel. See column 1.

U.S. Pat. No. 8,445,423, developed by some of the co-inventors of the present invention, discloses wipes treated with organometallic compounds used in combination with organic acids in kit form, particularly organophosphorus acid, which kits can be used to treat various surfaces to alter the physical properties of the surfaces. Specifically this patent teaches using wipes to deliver SAMPS to a surface using solvent diluents such as alcohols.

U.S. Patent Publication 2011-0252884, developed by Weston Aerospace Limited, provides a vibrating cylinder transducer for measuring the pressure or density of a fluid medium, wherein the surface coupled to the fluid medium is coated in a corrosion resistant polymer layer. Specifically the reference states that "self assembled monolayer coatings, such as the phosphonates marketed for example by Aculon Inc., can be applied in a monolayer thickness, where the phosphonic acid end sticks to the metal and the carbon based tail provides the desired chemical properties, i.e. a hydrophobic corrosion resistant coating. The coating is formed by degreasing the surface, priming the surface and then applying the coating."

U.S. Patent Publication 12-0104362, developed by some of the co-inventors of the present invention, discloses a method for altering an electronic property of a structure comprising an oxide surface or an oxide surface in electronic communication with the structure, the method comprising providing a covalently-bound film comprising at least one organic acid residue on a portion of the oxide surface so that at least one of the following properties of the structure is modified: (a) the charge carrier injection barrier properties; (b) the charge conductivity properties; (c) the charge transport properties; (d) the work function properties; (e) the sub-threshold slope; and (f) the threshold voltage. Specifically this reference teaches using organic acids to surface modify sensors. See Paragraphs [0046] and [0099].

DEVELOPMENT OF PRESENT INVENTION

Sometime at least as early as February 2013 employees of Electrolab, Inc. proposed using Aculon's commercially available Self-Assembled Monolayers of Phosphonates (SAMP) impregnated in wipes as a coating for the reduction of Paraffin and Asphaltene deposition on stainless steel and other nickel alloy components in crude oil service. This commercially available treatment was known as the Aculon's Nanoclear Metal Stencil Treatment and was Aculon's oleophobic metal treatment technology, the details of which are spelled out in the patent literature.

On Jun. 21, 2013, representatives of Electrolab, including some co-inventors of the instant application, met with representatives of Aculon, including some co-inventors of the instant application, to discuss the use of Aculons SAMP chemistries as a coating for the reduction of Paraffin and Asphaltene deposition on stainless steel and other nickel alloy components in crude oil service. In this meeting, Electrolab identified that although some promising tests were conducted, the existing commercially available SAMP compositions were unsuitable for manufacturing applications as a coating for the reduction of Paraffin and Asphaltene deposition on stainless steel and other nickel alloy components in crude oil service.

In the meeting on Jun. 21, 2013, Dr. Hanson first proposed options to slow the rate of evaporation of the Aculon SAMP formulations for acceptable results in the proposed application including reformulation of the product with slower drying solvents and the use of glycol based carrier chemistries. In the meeting it was determined that Dr. Hanson and Aculon would attempt to develop the method and alternative chemistries that would work in the intended application.

From June 21 till August 2013 Dr. Hanson and others at Aculon developed and tested several variations of the chemistry with the goals of the resulting formulations being: (1) a coating for the reduction of Paraffin and Asphaltene on treated substrates, (2) slow drying relative to existing commercial formulations, (3) able to be maintained within a wipe application, (4) functional for the treatment of sensors, and (5) able to withstand the adversities in crude oil service.

By August 2013, after several weeks of development and testing, two new chemistries developed by Dr. Hanson and others at Aculon were concluded to be acceptable for the proposed application, including a SAMP formulation with a glycol based carrier component. One of these formulations was concluded to be preferable, namely a SAMP formulation with a glycol based carrier component, which formulation was named NC-SLO™ (for Nanoclear Slow Drying).

Around Oct. 23, 2013, samples of the NC-SLO™ product were shipped to Electrolab for testing and by Nov. 5, 2013 Aculon was informed that results were acceptable. Later in November 2013 Aculon entered into an agreement to supply the NC-SLO™ formulation to Electrolab, but private label the chemistry as Electrolab's Anti-Paraffin Treatment™. Shipment of the NC-SLO™ formulation began around Dec. 18, 2013.

The present invention is centered around the newly developed NC-SLO™ formulation, namely a SAMP formulation with a glycol based carrier component which could be an effective coating for the reduction of Paraffin and Asphaltene on treated substrates, was slow drying relative to existing commercial formulations, was able to be maintained within a wipe application, exhibited functional application for the treatment of sensors, and was able to withstand the adversities in crude oil service.

SUMMARY OF THE INVENTION

The present invention is a new application of a modified, existing, chemical technology representing a significant potential for reduction in typical labor and costs of paraffin/asphaltene remediation in critical process instrumentation and the elimination of associated hazards. Using available nano-coating materials applied to cooperating surfaces of subject components produces permanent changes in the molecular characteristics of subject component metal, wetted parts and/or entire sensor assemblies, making them highly resistant to solids deposition in the extreme process environments normally encountered in petroleum production facilities. Again, the key strategy is to avoid the initial affixation of the paraffin and asphaltene deposits on the surface subject components.

The AP (Anti-Paraffin) Coating composition of the present invention provides a unique and cost-effective way for petroleum facility owner/operators to address common paraffin/asphaltene deposition on cooperating stainless steel and nickel alloy sensor components and instrumentation. It is anticipated that the present method may be utilized with a wide range of metals as well as non-metallic components. It is an object of the present invention is to provide an effective and environmentally friendly bicycle chain and gear maintenance system.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE FIGURES

FIGS. 4A-4C illustrate capacitance sensors having cylindrical outer housings.

FIGS. 4D-4E show an alternative embodiment of a capacitance sensor having a generally rectangular outer housing.

FIG. 4F is a perspective view of the embodiment of FIGS. 4D and 4E.

DESCRIPTION OF THE PREFERRED EMBODIMENTS

The present invention, to reduce paraffin/asphaltene deposition on stainless steel and nickel alloy components, utilizes a composition known as a Self-Assembled Monolayer of Phosphonate (SAMP). SAMP is commercially available from a wide range of suppliers. One such supplier is Aculon, Inc., San Diego, Calif. who assisted in the development of the present invention. Typically, SAMP is utilized with an alcohol-based carrier which allows for rapid drying. It is anticipated that the SAMP may be combined with a glycol carrier for use in the treatment of components used in crude oil service operation.

A monolayer is a nanoscale coating that is one molecule thick or 1-4 nanometers in thickness (1 nm=1.times.10-9 meters). A phosphonate is a phosphorous acid connected with a carbon-based group through a highly stable phosphorus carbon bond.

The phosphonic acid reacts with the component surface through stable metal phosphorus bonds, and the carbons are chosen for their non-stick chemical functionality. The SAMP is covalently bound to the substrate, forming a durable, low-surface tension, non-stick surface. This permanent chemical bond is highly stable under ambient conditions. Currently, an alcohol-based carrier is combined with the SAMP in some applications, but using a glycol-based carrier is unique in the crude oil environments of the invention.

Through standard Dyne pen testing, surface energy is shown to be significantly and permanently reduced through application of a nano-coating to the tested component. Field trials with components treated via the present inventive process indicate a significant reduction of paraffin/asphaltene deposition on stainless steel sensor components installed in crude oil storage tanks operated in low acidity/low turbulence applications at normal temperatures.

Figure 1:
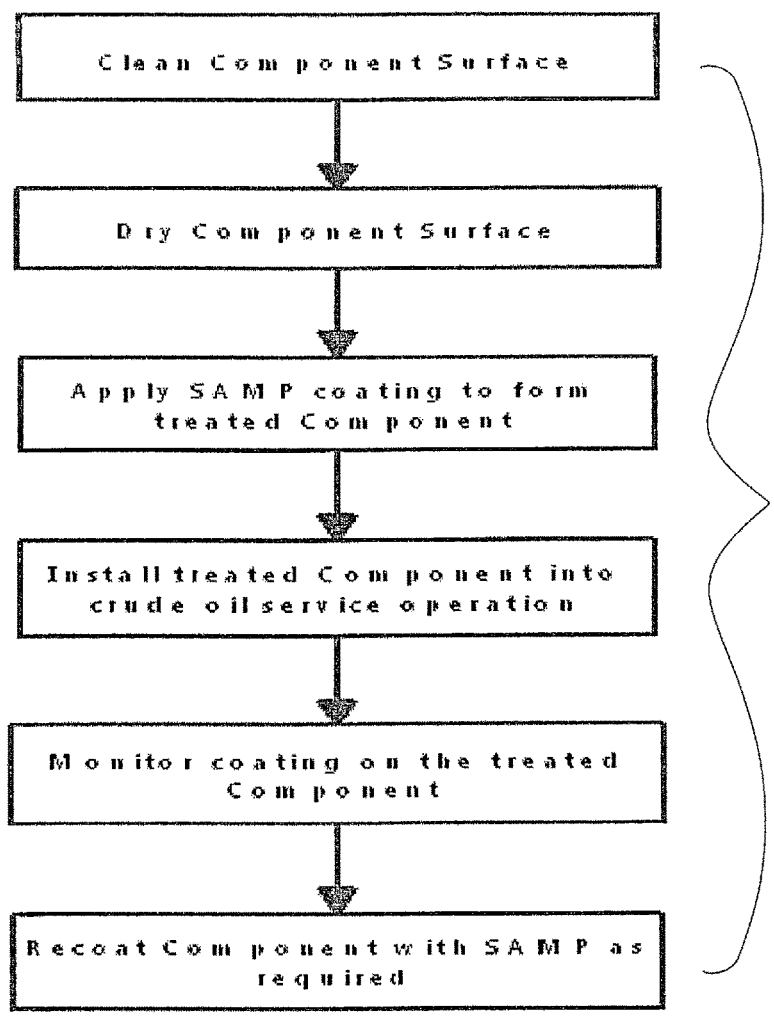
FIG. 1 illustrates a diagram of the present invention method showing the process steps.

The present inventive process may be utilized in the manufacture of sensors and instrumentation for a crude oil service operation. The method is simple: clean, dry, apply, insert, and monitor process, as illustrated in FIG. 1.

Figure 3:
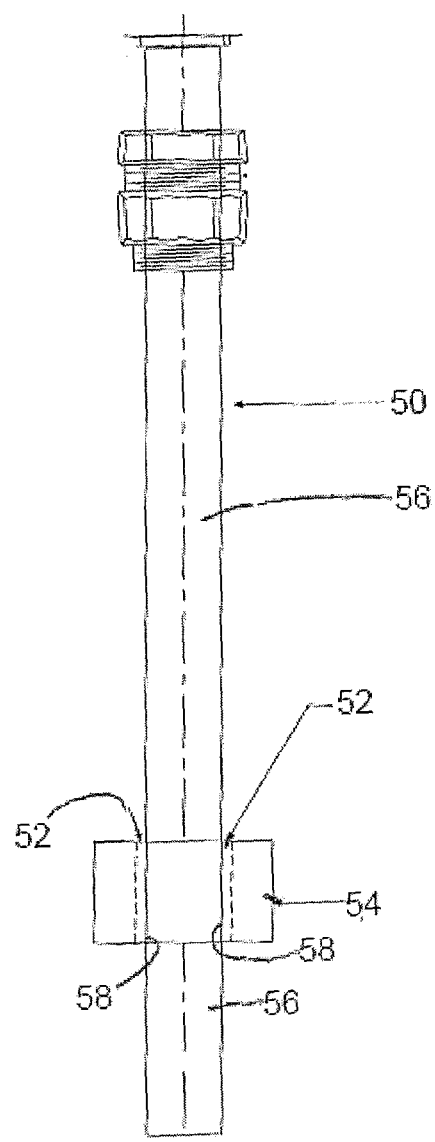
FIG. 3 is a basic illustration of some components of a digital level sensor described in this application.

As an example, the manufacture of a vertical crude oil storage tank level sensor includes a continuous 316L, square, stainless steel outer tubing that cooperates with the float carrier and all electronic sensor components and switches that are activated by the movement of float carrier to measure the level of the liquid in the storage tank. FIG. 3 shows the square tubing 50 of a digital level sensor (DLS), a float carrier 52 with floats members 54 attached to the carrier 52. During operation, the outer surface 56 of tubing comes into contact with the inner surface 58 of the carrier 52. This sliding contact between the tubing 50 and the inner surface 58 of the float carrier 52 is adversely affected if paraffin or asphaltene deposits build up on these surfaces. When deposits build up on the surfaces of the components, the float carrier 52 does not freely move up and down the tubing 50, thereby causing false level readings in the digital level sensor. The outer tubing extends the entire length of the sensor from top tank connection to the bottom of the sensor. After assembly and testing, the sensor is disassembled and the nano-treatment is completed in the following steps:

a. The sensor assembly including the stainless steel tubes 50, float carrier 52, and floats 54 are placed on horizontal support racks. The entire sensor assembly is thoroughly cleaned on all sides with an alcohol or phosphate-based detergent laden sponge or wipe 60 to remove any mill oil, dirt, grease, etc. and liberally flushed with clean water. This process step is repeated until all visual indications of surface contaminants are removed.

b. The assembly is thoroughly dried using clean, lint-free cloth or absorbent paper towels.

c. Immediately after drying, the nano-treatment chemical composition of the present invention (SAMP) is directly applied to the clean outer tube surfaces 56 and the inner carrier surfaces 58 of the assembly parts with a soft cloth or wipe 62 impregnated with the SAMP composition and gently rubbed into the outer surface 56 and inner surface 58 in order to assure complete chemical coverage. After approximately 1 minute of contact time, excess SAMP composition residue is removed and the complete assembly is thoroughly dried and reassembled.

Figure 4A:
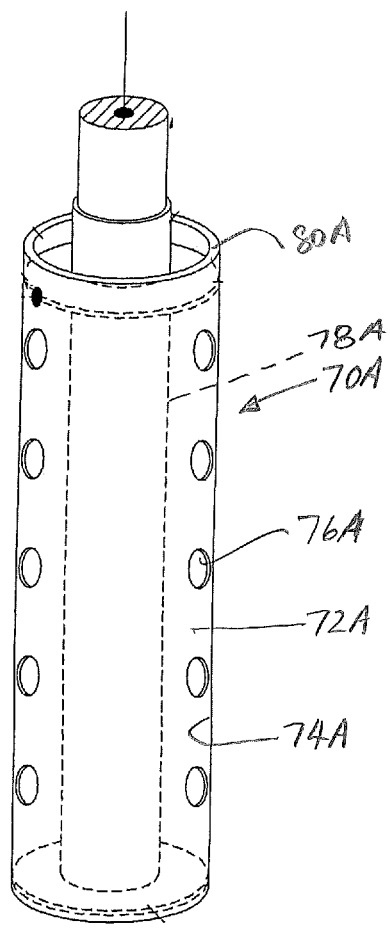
FIGS. 4A-4F are illustrations of capacitance sensors which have been treated along exposed surfaces with the anti-paraffin coating composition of the present invention.
Figure 4B:
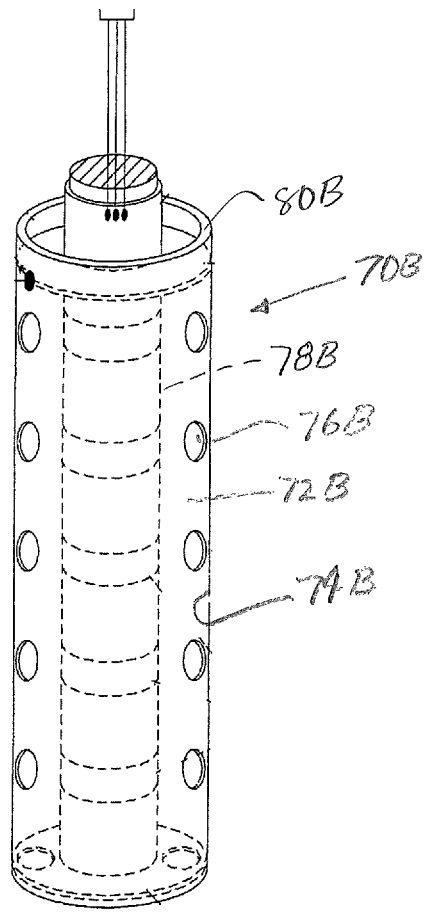
Figure 4C:
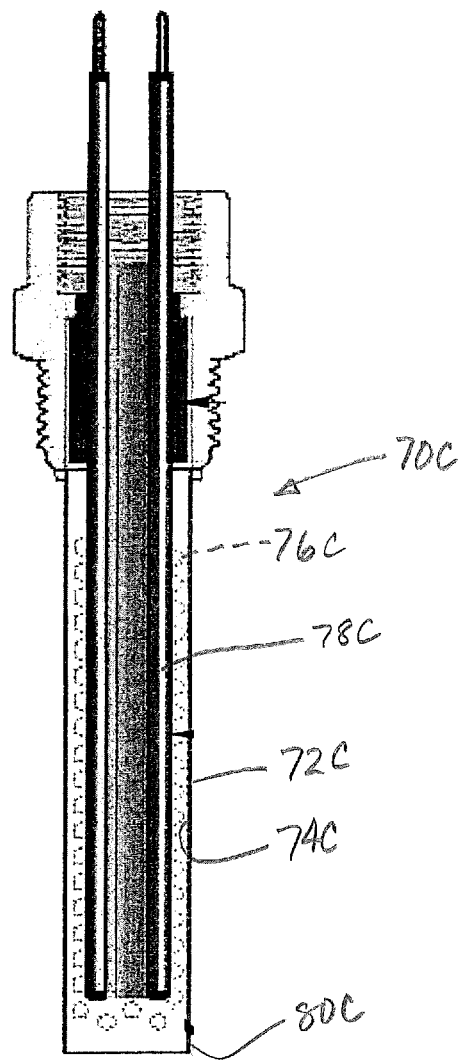
Figure 4F:
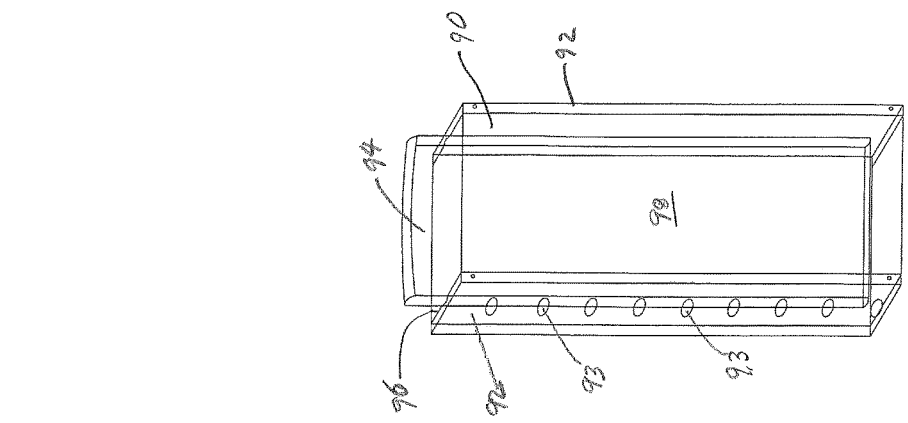
Figure 4E:
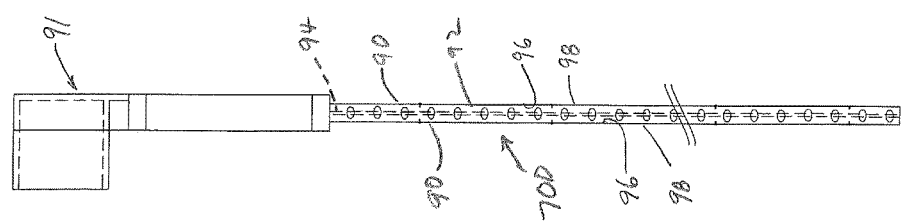
Figure 4D:
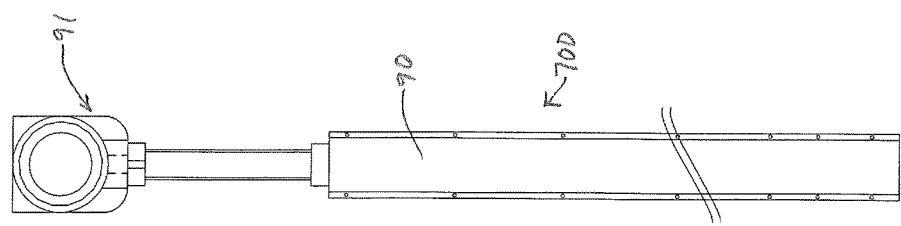

According to the present inventive method, capacitance sensors 70A, 70B, 70C and 70D as shown in FIGS. 4A-4F may be treated as described above. The nano-treatment chemical composition (SAMP) is directly applied to the clean outer surfaces 72A, 72B, 72C, 72D; the inner surfaces 74A-74D; and core elements 78A-78D as described above. It may be further understood that openings 76A, 76B, and 76C in FIGS. 4A-4C allow crude oil to flow through the sensors, 70A-70C and become exposed to the sensor core 78A-78C. In FIGS. 4D-4F, capacitance sensor 70D has a different, unique design wherein rather from utilizing a generally, cylindrical tube 80A-80C, as shown in FIGS. 4A-4C, two spaced-apart stainless steel plates 90 are held in a generally parallel relationship by two, perforated plastic sidewalls 92. A shrink wrapped printed circuit board sensor 94, with an explosion-proof head 91 attached to one end of the sensor, is disposed within the generally rectangular enclosure or housing formed by the two steel plates 90 and the perforated plastic side walls 92.

The nano-treatment chemical composition (SAMP) is applied to the inner surfaces 96 and outer surfaces 98 of the spaced-apart stainless steel plates 90. Crude oil flows through the perforation 93 in the sidewall 92 to be read by the sensor printed circuit board 94.

Excess SAMP composition residue is removed from the treated surfaces. With the sensors 70A, 70B, 70C and 70D, it is the utilization of the anti-paraffin composition along the surfaces exposed to the crude oil which reduces the paraffin build-up which may affect the sensitivity of the sensor.

In future applications involving larger scale factory coating processes, the manual system described above will utilize more automated processes, including spray-type applicators and/or a tank dip system.

Figure 2:
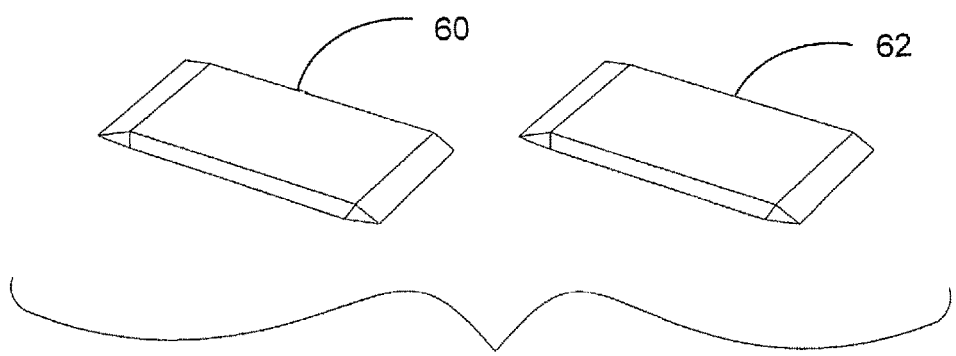
FIG. 2 is the perspective view of a foil packet of the present inventive kit.

In another embodiment, a kit may be employed wherein individual wipes 60 and 62 (FIG. 2) are separately sealed and robustly packaged to withstand long-term storage and handling. Wipe 60 is a cleaning wipe having an alcohol or phosphate-based detergent. Wipe 62 is impregnated with a SAMP composition appropriate for the application. The chemical components are non-toxic, REACH compliant (having approximately the same environmental characteristics as common isopropyl alcohol), and have no known adverse environmental impacts. No specialized training or Personal Protective Equipment (PPE) is required for use.

A proper application of the nano-coating composition produces a permanent molecular bond that is highly stable under normal ambient conditions. However, components subjected to turbulent flow profiles in which basic sediment index is high (abrasive service), or those subject to high acidity/temperature may require a re-application of the protective coating due to surface abrasion of the metal component.

It should be understood that the AP coating is monitored to evaluate the effectiveness of the SAMP composition coating. Recoating of components may be accomplished by cleaning, drying, and applying, as described above.

It should be understood that the SAMP composition of the present invention may be enhanced by the addition of tracer additives which impart a "tint" or color to treated components. Such "tinting" will result in an observable indication of the sufficiency of the component coating. As the "tint" intensity decreases, the operator will be able to determine if additional coating coverage is required. Further, enhancements may include additives to produce a wider range of component surface characterizations including, but to limited to, corrosion inhibitors, anti-static properties, and the like. As described above, utilization of a glycol-based carrier component to the SAMP composition may enhance crude oil process/service applications.

The foregoing is considered as illustrative only of the principles of the invention. Further, since numerous modifications and changes will readily occur to those skilled in the art, it is not desired to limit the invention to the exact construction and operation shown and described.

Those skilled in the art will recognize other embodiments of the invention which may be drawn from the illustrations and the teachings herein. To the extent that such alternative embodiments are so drawn, it is intended that they shall fall within the ambit of protection of the claims appended hereto.

What is claimed is:

1. A method for treating cooperating surfaces of an elongated stainless steel tube and a float carrier of a digital level sensor utilized in a crude oil service operation comprising the steps of:
    cleaning select surfaces of said tube and float carrier to remove surface contamination;
    drying said cleaned surfaces of said tube and float carrier;
    applying a coat of a Self-Assembled Monolayer of Phosphonate (SAMP) composition within a glycol based carrier to said cleaned and dried surfaces of said tube and float carrier to form treated components; and
    installing said treated components into a section of a crude oil service operation, said coating reducing paraffin/asphaltene deposition on said treated components.

2. The method of claim 1 wherein said applying step further comprises utilizing a nano-coating wipe impregnated with said SAMP composition.

3. The method of claim 2 wherein said cleaning step further comprises utilizing a cleaner/wipe impregnated with a cleaning substance.

* * * * *